United States Patent [19]

Reynier et al.

[11] Patent Number: 4,762,208

[45] Date of Patent: Aug. 9, 1988

[54] VIBRATION DAMPER FOR A TOWED BODY

[75] Inventors: René Reynier, Cagnes sur Mere; Jean G. Malcor, Biot; Gilles Moresco, Le Cannet Rocheville; Francois Ramoger, Cannes, all of France

[73] Assignee: Thomson-CSF, Paris, France

[21] Appl. No.: 878,267

[22] Filed: Jun. 25, 1986

[30] Foreign Application Priority Data

Jun. 28, 1985 [FR] France .................. 8509892

[51] Int. Cl.$^4$ ........................... F16F 15/02
[52] U.S. Cl. .................. 188/288; 188/266; 267/69; 367/154
[58] Field of Search .......... 188/288, 266; 267/69, 267/138; 114/244, 245, 242, 247, 253; 367/154, 20, 110

[56] References Cited

U.S. PATENT DOCUMENTS

| | | |
|---|---|---|
| 2,878,013 | 3/1959 | Piodi . |
| 3,231,255 | 1/1966 | Olson . |
| 3,371,311 | 2/1968 | Cholet et al. . |
| 3,518,677 | 6/1970 | Florian .................. 367/154 |
| 3,696,325 | 10/1972 | Tallman . |
| 4,090,168 | 5/1978 | Miller et al. . |
| 4,116,153 | 9/1978 | Fisher et al. . |
| 4,241,427 | 12/1980 | Swenson .................. 367/154 |
| 4,295,212 | 10/1981 | Swenson .................. 114/244 |
| 4,402,069 | 8/1983 | Miller et al. .................. 367/154 |
| 4,426,908 | 1/1984 | Ullmann .................. 114/253 |
| 4,628,851 | 12/1986 | Appling .................. 114/253 |

FOREIGN PATENT DOCUMENTS

| | | |
|---|---|---|
| 459422 | 9/1949 | Canada .................. 114/253 |
| 675502 | 5/1939 | Fed. Rep. of Germany . |
| 724359 | 8/1942 | Fed. Rep. of Germany . |
| 1623488 | 2/1971 | Fed. Rep. of Germany . |
| 3044709 | 7/1982 | Fed. Rep. of Germany . |
| 1161994 | 9/1958 | France . |
| 2050020 | 3/1971 | France . |
| 2310498 | 12/1976 | France . |
| 347154 | 3/1937 | Italy .................. 267/69 |
| WO83/00564 | 2/1983 | PCT Int'l Appl. .................. 367/154 |
| 320050 | 4/1957 | Switzerland . |
| 13310 | of 1911 | United Kingdom . |

Primary Examiner—Randolph A. Reese
Assistant Examiner—Anthony Knight
Attorney, Agent, or Firm—Oblon, Fisher, Spivak, McClelland & Maier

[57] ABSTRACT

A vibration damper is provided for a towed body usable more particularly as head section of an underwater antenna towed by a boat and containing detection and measuring instruments.

The damper of the invention comprises at least one piece with high loss angle in contact with a traction element so that vibrations perceived by the traction element cause deformations of said piece.

2 Claims, 4 Drawing Sheets

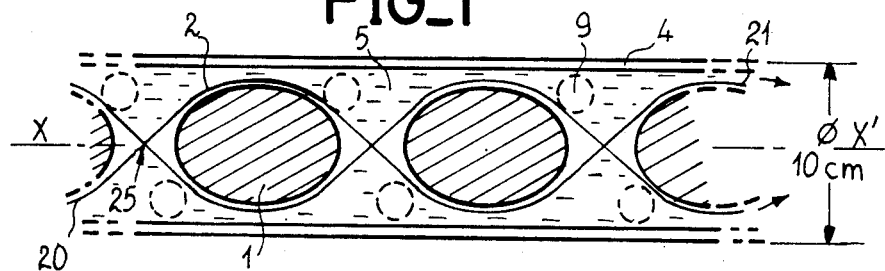
FIG_1
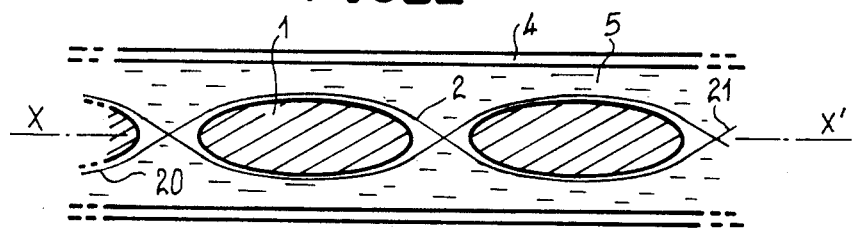
FIG_2
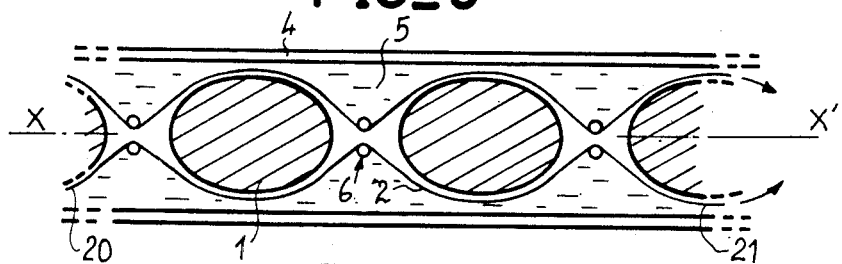
FIG_3
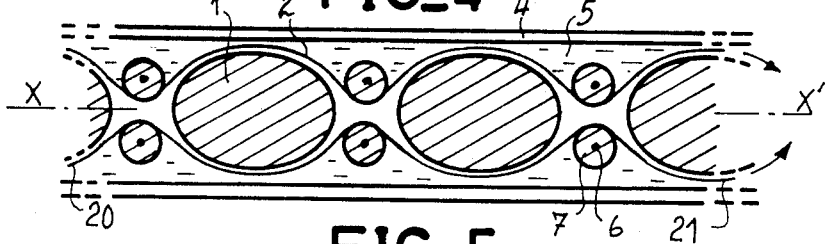
FIG_4
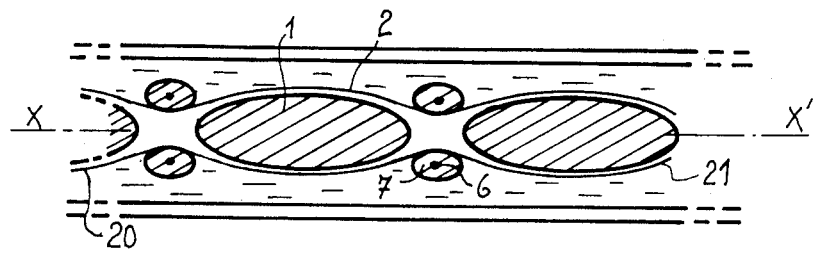
FIG_5

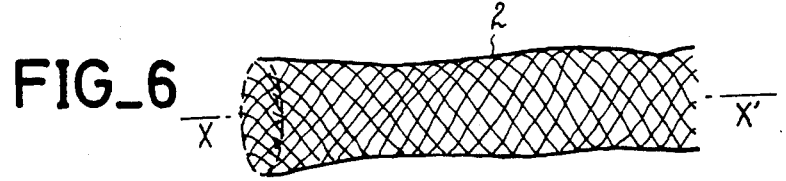
FIG_6
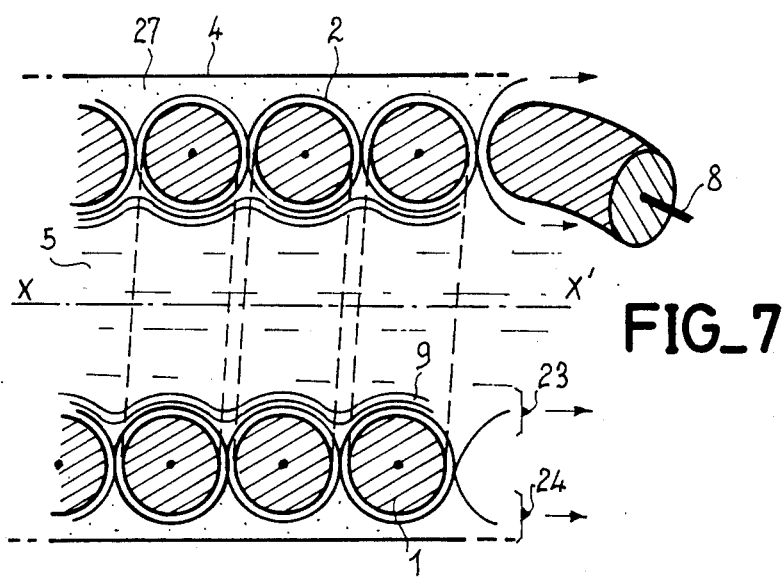
FIG_7
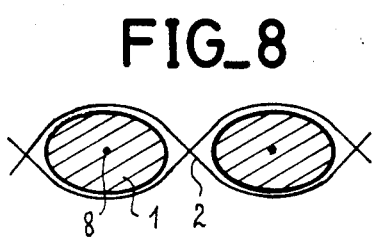
FIG_8
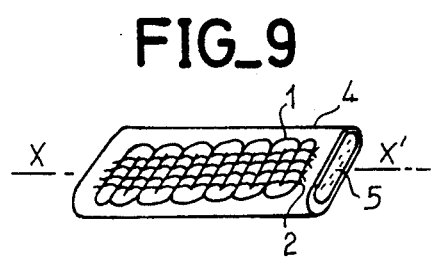
FIG_9
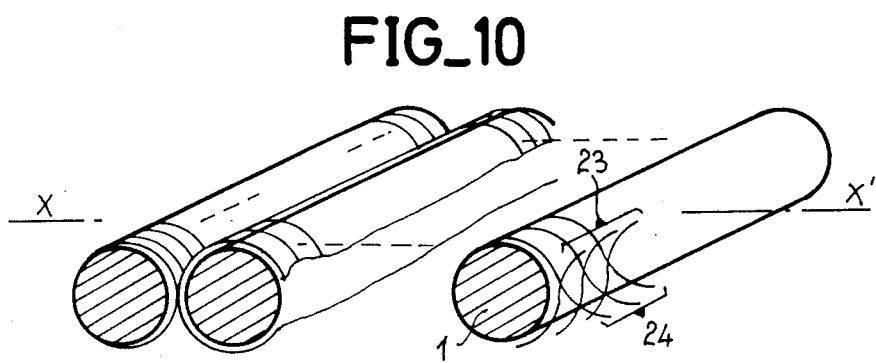
FIG_10

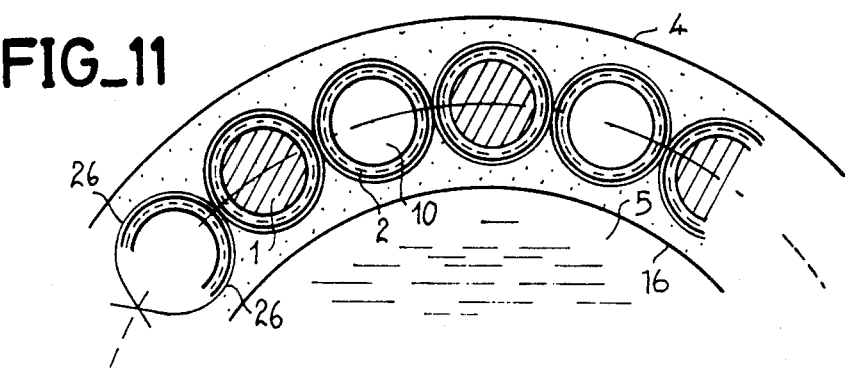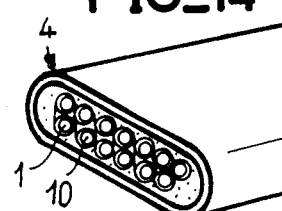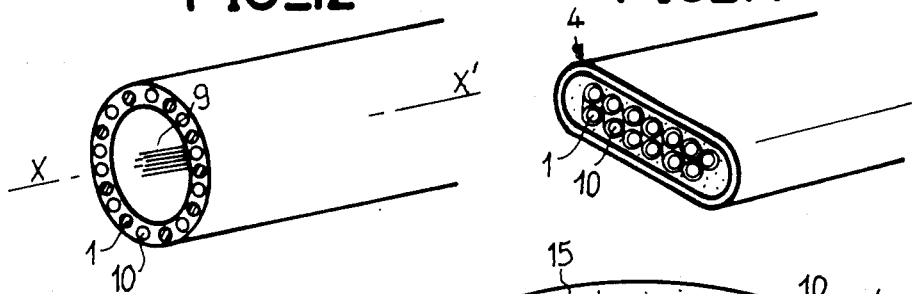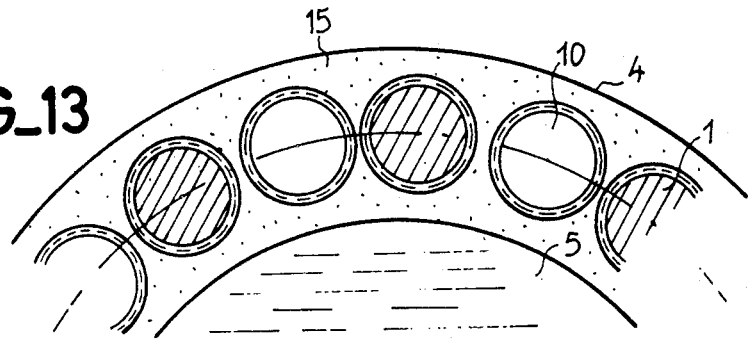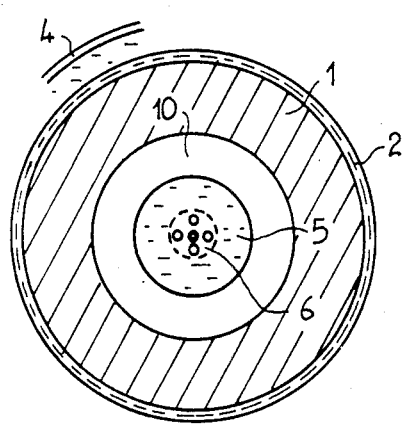

FIG_16
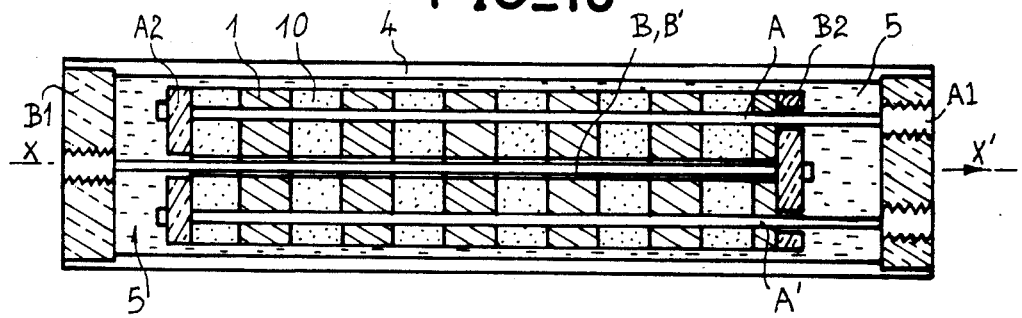
FIG_17
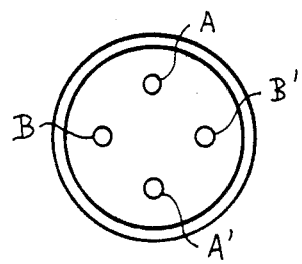
FIG_18
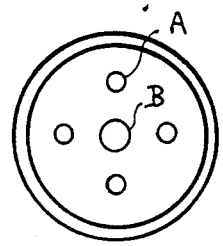
FIG_19
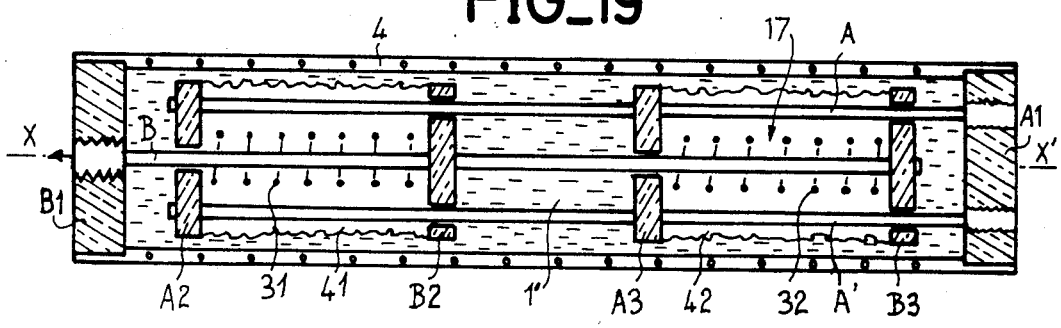
FIG_20
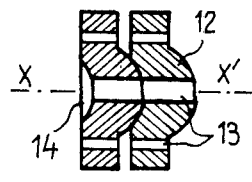
FIG_21  FIG_22
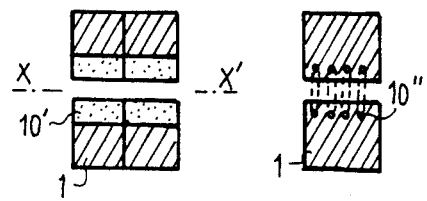

VIBRATION DAMPER FOR A TOWED BODY

BACKGROUND OF THE INVENTION

The invention relates to a vibration damper for towed bodies and more particularly to a damping section of a towed body also serving as hitching means. More particularily, this section forms the head section of a linear underwater antenna towed by a boat, called a "streamer".

These streamers are generally intended to contain detection and measuring instruments and must be protected from the vibrations of the towing boat as well as from the wash created in its wake.

It is a question then of mechanically decoupling a towed body from the towing cable (or other devices) so as to prevent any vibration from the boat being transmitted to the towed instrument carrying body. These vibrations may have several origins such as the movement of the towing vehicle or the turbulence of the limit layer along the cable.

In the case where the towed body is a streamer, specific requirements appear, namely:
  sealing and immersibility,
  independence at the static pressure,
  controllable density,
  winding under a tractive force,
  severe environment (sea, ozone, UV light, . . . )
  passage of connecting cables for connecting
the instruments contained in the streamer to the towing boat.

It is known to insert between the towed body and the towing vehicle a section made from a controlled loss material. This material has a loss angle whose value is such that correct damping of the vibrations is obtained.

It will be recalled that a loss material is a material which, undergoing a stress tending to deform it, shows a certain delay in deformation with respect to the time of application of the stress. Whereby, after removal of the stress, it resumes its original shape after a certain delay.

The loss angle of a loss material characterizes this delay existing between the application or removal of the stress and the deformation of the material.

Since the material, by definition, is not perfectly elastic, such a damper is subjected to the severe conditions of use and storage, such as is the case for streamers, and does not have a long lifespan.

It is also known to use mass-spring type devices or else dashpot type devices (piston-diaphragm). However these devices are not suitable because of the requirement of winding under a tractive force.

The invention arranges then for using a loss material. More particularly, the vibration damper of the invention will be designed so that the tractive forces give rise to losses in a "loss" material so that this material works under good conditions. The loss material used may just as well be, in the embodiment of the invention, a solid material as a viscous liquid material.

SUMMARY OF THE INVENTION

The invention concerns then a vibration damper for towed bodies having a traction element disposed in a given direction, with a first end on which is exerted a tractive force directed in said direction, and a second end to which the towed body is connected, further including at least one piece of a loss material applied against the traction element so that the vibrations exerted in said direction cause deformations of the loss material piece.

The invention also relates to a vibration damper for a body towed by a towing device, having a first cheek connected to one end, itself connected to the towed body by flexible cables, a second mobile cheek disposed parallel to the first cheek and connected to another end, itself connected to the towing device by flexible cables, at least one module made from a loss material placed between the first and second cheeks, the two cheeks moving counter directionally under the effect of the vibrations for compressing the loss material module.

BRIEF DESCRIPTION OF THE DRAWINGS

The different objects and features of the invention will now be described with reference to the accompanying Figures which show:

FIGS. 1 and 2, an embodiment of the damper of the invention including crossed weaving;

FIGS. 3 to 5, an embodiment of the damper of the invention including clamping rings;

FIG. 6, a woven element usable in the embodiments of FIGS. 3 to 5;

FIG. 7, an embodiment of the damper of the invention in which the loss material piece is a spirally wound rope;

FIG. 8, an example of deforming a turn of the rope of FIG. 7;

FIGS. 9 and 10, an embodiment of the damper of the invention in which the loss material piece is a rope or portions of ropes laid flat;

FIGS. 11 to 14, an embodiment of the damper of the invention, in which the loss material pieces are portions of ropes disposed parallel to the axis of the damper, in the direction of the tractive forces to which the damper is subjected;

FIG. 15, embodiment of the damper of the invention, formed from a single cord; and FIGS. 16 to 22, embodiments of the damper of the invention including cheeks for compressing the loss material.

DETAILED DESCRIPTION OF THE INVENTION

Referring to FIG. 1, a first embodiment of a vibration damper in accordance with the invention will be described.

The damping section is formed from a resilient mechanical and climatic protective sheath 4 in which is enclosed a structure formed of loss material pieces 1 of identical volumes placed in series. Each piece is enclosed in traction elements 2 formed as a textile structure from material withstanding the traction and taking up the stresses.

Traction elements 2 are for example the fibers of a woven sleeve. The weaving is crossed at 25 at regular intervals over the length of the sleeve and determining in the sleeve a certain number of spaces or cavities in which the loss material pieces 1 are imprisoned.

As shown in FIG. 1 each piece 1, for example an ellipsoidal shape, is nipped by the textile structure.

When tractive forces are exerted at the ends 20 and 21 of fibers 2, these forces tend to make these fibers rectilinear and to deform, as shown in FIG. 2, the loss material pieces 1.

Because the pieces 1 are tightly held by the weaving 2, the crushing and release of these pieces produce the desired damping.

Under these conditions, when the towed body is attached on the side of end 20 of fibers 2 and the towing boat attached to the side of ends 21 or conversely, pieces 1 will be compressed by fibers 2 and will be deformed under the effect of the vibrations as is shown in FIG. 2.

The assembly thus described is held in position in sheath 4. By way of example, in the case of application to an underwater streamer, such a sheath 4, and so substantially each piece 1, will have a diameter of about 10 cm. So as to obtain correct damping, the loss material used for pieces 2 will have a loss angle δ such that:

$$0.2 < \tan\delta < 0.5$$

For example, the loss material is a polybutadene, epichlorhydrine, polynorbornene, or else a butyl and halobutyl based product.

The textile structure used is for example made from aramid fibers, such as those sold under the trademark Keular or metal fibers.

To complete the device of FIG. 1, pieces 1 and fibers 2 are embedded in a liquid 5 with which sheath 4 is filled. The density of this liquid is provided so that, in use in water for towing a streamer, the vibration damper is screened from the hydrostatic pressures.

As shown in FIG. 1, one or more connections extending through sheath 4 are also provided in the case where the towed body must exchange information with the towing boat or receive an electric power supply. In FIG. 1, the passage zones 9 of such a cable have been shown with broken lines.

In a variant of construction of the invention, the textile structure 2 forms a substantially cylindrical tube as shown in FIG. 6.

For constructing a damper similar to that of FIG. 1, clamping rings 6 are provided placed on each side of pieces 1 about the textile structure 2. A damper such as shown in FIG. 3 is obtained.

The clamping rings may comprise, as shown in FIG. 4, a rigid ring 6, made from metal for example, coated with a torus 7 made from a loss material similar to the material of piece 1. Under these conditions, the rings contribute to the damping effect of the damper. The variations of the traction, under the effect of the vibrations, exerted on ends 20, 21 of the fibers then result in crushing the loss material pieces 1 as well as the tori 7 as is shown in FIG. 5.

In another embodiment of the invention, the damping structure is integrated in the sheath. As shown in FIG. 7, the damping section is formed of a rope 1 made from a loss material forming a circumferential weft with jointing turns. These turns are enclosed and held together by a textile structure 2 forming the warp and taking up the stresses. The extension is limited by localized crushing of the rope. The radial expansion is limited by a cord 8 placed inside the rope. There is a sheath 4 serving as outer mechanical and climatic protective coating and an inner membrane 9 sealed with respect to the buoyancy liquid 5 whose role was described above with reference to FIG. 1. Crushing and relaxation of the rope under the effect of the fibers of the textile structure 2 produce the damping. The materials are for example those mentioned in the first embodiment.

In FIG. 8, the effect of deformation of the loss material 1 has been shown.

In a variant of construction not shown, the damping section of FIG. 7 comprises a rope made from a loss material 1 and a rope made from an elastic material. The two ropes are wound in interlaced spirals with jointing turns.

Rope 1 may also be mounted flat, as is shown in FIG. 9, inside a sheath 4 having a general flat trend instead of cylindrical. The section is in the form of a ribbon placed inside a sheath of oval section and filled with a balancing liquid as shown in FIG. 9.

The active part of this damping section has been shown in detail in FIG. 10. The different portions of rope 1 are held in position and restrained by two interlaced fiber lattices 23 and 24.

The construction of such a damper may use rope portions instead of a single rope. It is possible in a variant to provide, as mentioned above, cord portions 1 made from a loss material and, inserted therebetween, elements made from an elastic material, preferably of the same dimensions as the rope portions. In another variant of construction, the damping section is formed of longitudinal jointing ropes forming the warp of the sheath. As shown in FIGS. 10 and 11, a rope 10 formed of an elastic material is alternated for example with a rope 1 formed of a loss material. Each rope is surrounded by a textile sheathing 2 which limits the extension to 10-20% of the total extension. This limitation is provided locally and is distributed over the whole of the length. The textile sheathing takes up the stresses and it is braided diagonally so as to obtain compression without stretching.

The ropes are held together by weft cords 26 disposed perpendicularly to the axis of the section and which limit the radial expansion by 5 to 10%.

There is an outer mechanical and climatic protective coating 4 in which the weft threads may be embedded and an inner membrane 16 sealed with respect to the filling liquid 5 which is either connected to the weft threads or independent and is held applied by the internal pressure of the filling liquid 5.

The tractive force is applied to this section along the axis of the section by the ends of the textile sheathings 2 extending from the ends of the section. Under the effect of the vibrations, the textile sheathing compresses the loss material ropes which work under compression and thus produce damping. The weft threads which nip the ropes also play a role in the damping.

In a variant, the weft threads are omitted and the ropes are embedded in a homogeneous material 15 also serving as mechanical and climatic protective case. Thus a construction of the type shown in FIGS. 12 and 13 is obtained.

In another embodiment, the ropes are placed "flat" as shown in FIG. 14. The section is in the form of a ribbon placed inside a sheath of oval section filled with the balancing liquid.

Another embodiment is shown in FIG. 15.

It consists in forming the damping section with a single rope of larger diameter. It is formed of two coaxial sleeves, a central sleeve 10 made from an elastic material and an outer sleeve 1 made from a loss material. The outer sleeve 1 is covered by a textile sheathing 2 forming a braid which takes up the stresses and is anchored at two end junctions of the section. The central recess 6 serves for passing connections and is filled with the buoyancy liquid 5. The central recess allows the radial compression of the materials by the braid so as to cause the damping. A resilient protective sheath 4 may be provided In another embodiment of the invention, loss material modules are compressed between two cheeks whose relative movements are contradirectional under the effect of the vibrations. FIGS. 16 and 18 show one embodiment of a streamer damping section following the above described principle.

Two cheeks A2 and B2 are connected to the two end junctions $A_1$, $B_1$ of the damping section by means of flexible stress absorbing cables A, A' and B, B' so that, when the junctions move away from each other, under the effect of the vibrations, the cheeks draw reciprocally close to each other. These cables are anchored at the junctions.

Cheek B2 is drawn by the cables B and B' and cheek A2 is drawn by the cables A and A'. Cheek B2 has passage holes for sliding over cables A and A'. Similarly, cheek A2 has passage holes for sliding over cables B and B'. The arrangement of the axes A, A', B, B' is shown in FIG. 18. In the alternative, the embodiment of FIGS. 16 and 18 may be modified such that the axes A, A', B and B' are arranged as shown in FIG. 17.

Between cheeks A2 and B2 are disposed modules made from an elastic material 10 and modules made from a loss material 1. The number of these modules, their form and composition are studied so as to obtain good damping.

The assembly formed by the cheeks, the loss material and elastic material modules as well as the traction cables is enclosed in a sealed envelope 4 which may contain a buoyancy liquid as in the preceding embodiments. This envelope 4 is a resilient sheath.

FIGS. 20, 21 and 22 show embodiments of modules 1 and 10.

In FIG. 20, each module 1 and 10 comprises a part in the form of a spherical skull cap 12 situated on one side of the module and along the axis of the module. The other side of each module has on the contrary a spherical cavity 14. The different modules are stacked along their axis so that the spherical skull cap 12 of one module fits into the coaxial cavity 14 of the adjacent module. The passages 13 are provided for cables such as A and B.

This arrangement gives flexibility to the section of the damper and allows it to be wound on a cable drum like the traction cable to which it belongs.

In FIG. 21, each module comprises an outer ring (1) made from a loss material which is shown by hatching in the Figure and an inner ring (10') made from a resilient material shown with dots in the Figure.

In FIG. 22, each module comprises, incorporated in the mass of the loss material, a spring 10'' disposed along the axis of the module, that is to say in the direction of the compression of the module within the field of its use in the damper of FIG. 16.

FIG. 19 shows a variant of construction described above with reference to FIG. 16, in which the damping is produced by a viscous liquid 1' so forming the loss material.

Several cheeks A2, A3 and B2, B3 are placed in series so as to form several compression zones. Cheeks A2 and A3 are connected to several traction cables A, A'. Cheeks B2 and B3 are connected to one or more traction cables B, B' with cheek B2 placed between cheeks A2 and A3 whereas cheek A3 is placed between cheeks A2 and B3.

Cheeks A2 and B2 on the one hand and A3 and B3 on the other define two compression zones. The inside of these zones is filled with a foam 17 with communicating cells 41 bonded to the cheeks. A return spring 31, 32 is introduced in the foam between two cheeks of each compression zone. So that the sheath 4 does not follow the movement of the loss liquid 1' which fills the section, it is stiffened radially as is shown by the small circles drawn in the sheath 4 of FIG. 19. The loss liquid serves as buoyancy liquid in this embodiment.

In FIG. 19, two pairs of intercalated cheeks A2, A3 and B2, B3 are provided defining two compression zones, but it is obvious that without departing from the scope of the invention it is possible to provide a larger number of pairs of cheeks which would then define a larger number of compression zones.

Obviously, numerous modifications and variations of the present invention are possible in light of the above teachings. It is therefore to be understood that within the scope of the appended claims, the invention may be practiced otherwise than as specifically described herein.

What is claimed is:
1. A vibration damper for a towed body comprising:
traction means for transmitting a tractive force in a generally longitudinal direction of said vibration damper, said traction means comprising at least one traction element having first end on which a tractive force is exerted in said longitudinal direction and a second end for connection to a towed body; and
a plurality of substantially adjacent and similarly-shaped pieces of energy-absorbing material, at least one of said pieces of energy-absorbing material being made of a loss material,
said traction means comprising a sleeve of a woven textile material woven into a plurality of adjacent cavities, said cavities respectively containing said pieces of energy-absorbing material, the weave of said sleeve surrounding individual ones of said pieces and crossing itself between adjacent pieces, said crossing forming adjacent ones of said cavities,
said traction means comprising means responsive to vibrations in said tractive force for deforming said at least one piece of loss material.
2. The vibration damper as claimed in claim 1 wherein said sleeve is surrounded by a sheath containing a balancing fluid, there being formed along the sheath, thereinside, connection passage zones for supplying the towed body with power and for information transmission.

* * * * *